United States Patent
Takada

(10) Patent No.: US 11,612,014 B2
(45) Date of Patent: *Mar. 21, 2023

(54) COMMUNICATION DEVICE, COMMUNICATION METHOD THEREOF, INFORMATION PROCESSING DEVICE, CONTROL METHOD THEREOF, AND STORAGE MEDIUM

(71) Applicant: CANON KABUSHIKI KAISHA, Tokyo (JP)

(72) Inventor: Tomoyuki Takada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/358,109

(22) Filed: Jun. 25, 2021

(65) Prior Publication Data
US 2021/0321484 A1    Oct. 14, 2021

Related U.S. Application Data

(63) Continuation of application No. 16/830,605, filed on Mar. 26, 2020, now Pat. No. 11,083,045.

(30) Foreign Application Priority Data

Apr. 11, 2019 (JP) .............................. JP2019-075763

(51) Int. Cl.
*H04W 84/02* (2009.01)
(52) U.S. Cl.
CPC .................................. *H04W 84/02* (2013.01)
(58) Field of Classification Search
None
See application file for complete search history.

(56) References Cited

U.S. PATENT DOCUMENTS

| 8,831,007 B2 | 9/2014 | Asai et al. |
| 2015/0295629 A1 | 10/2015 | Xia et al. |

(Continued)

FOREIGN PATENT DOCUMENTS

| JP | 2016-201599 A | 12/2016 |
| JP | 2018-504028 A | 2/2018 |

(Continued)

OTHER PUBLICATIONS

Evgeny Khorov (IITP RAS), Experimental Study of NOMA/SOMA in Wi-Fi, IEEE 802.11-18/1957r3, IEEE, Internet <URL:https://mentor.ieee.org/802.11/dcn/18/11-18-1957-03-0eht-noma.pptx>, Mar. 11, 2019.

(Continued)

*Primary Examiner* — Jamaal Henson
(74) *Attorney, Agent, or Firm* — Venable LLP

(57) ABSTRACT

A communication device that transmits or receives a radio frame including a preamble and a data field of a physical layer (PHY) is provided. The preamble includes an L-STF (Legacy Short Training Field), an L-LTF (Legacy Long Training Field), an L-SIG (Legacy Signal Field), an EHT-SIG (Extremely High Throughput Signal Field), an EHT-STF (EHT Short Training Field), and an EHT-LTF (EHT Long Training Field), and the EHT-SIG includes a subfield in which information on whether NOMA (Non-Orthogonal Multiple Access) is used in transmission of data included in the data field is set.

14 Claims, 3 Drawing Sheets

(56) References Cited

U.S. PATENT DOCUMENTS

| | | | |
|---|---|---|---|
| 2015/0333878 A1 | 11/2015 | Yu et al. | |
| 2016/0014722 A1* | 1/2016 | Yoon | H04M 1/72412 |
| | | | 455/552.1 |
| 2016/0204969 A1* | 7/2016 | Zhu | H04L 5/0091 |
| | | | 375/261 |
| 2016/0277087 A1* | 9/2016 | Jo | H04B 7/0408 |
| 2016/0353424 A1* | 12/2016 | Stirling-Gallacher | |
| | | | H04B 7/0626 |
| 2017/0047989 A1 | 2/2017 | Oh et al. | |
| 2017/0048775 A1 | 2/2017 | Kim | |
| 2017/0170937 A1* | 6/2017 | Chun | H04L 5/0023 |
| 2017/0171771 A1 | 6/2017 | Jung et al. | |
| 2017/0346598 A1* | 11/2017 | Robert Safavi | H04W 52/283 |
| 2018/0084584 A1 | 3/2018 | Umehara | |
| 2019/0097850 A1 | 3/2019 | Kenney et al. | |
| 2020/0153571 A1 | 5/2020 | Suh et al. | |

FOREIGN PATENT DOCUMENTS

| | | |
|---|---|---|
| JP | 2018-050133 A | 3/2018 |
| WO | 2016-099140 A1 | 6/2016 |

OTHER PUBLICATIONS

Eunsung Park (LG Electronics), Consideration on 320MHz Bandwidth and 16 Spatial Streams, IEEE 802.11-19/0411r0, IEEE, Internet <URL:https://mentor.ieee.org/802.11/dcn/19/11-19-0411-00-0eht-consideration-on-320mhz-bandwidth-and-16-spatial-streams.pptx>, Mar. 11, 2019.

Japanese Office Action dated Dec. 5, 2022 in counterpart Japanese Patent Appln. No. 2019-075763.

* cited by examiner

COMMUNICATION DEVICE, COMMUNICATION METHOD THEREOF, INFORMATION PROCESSING DEVICE, CONTROL METHOD THEREOF, AND STORAGE MEDIUM

This is a continuation of U.S. patent application Ser. No. 16/830,605, filed Mar. 26, 2020.

BACKGROUND OF THE INVENTION

Field of the Invention

The present invention relates to a communication control technique in a wireless LAN.

Description of the Related Art

Along with the increase in data amount to be communicated in recent years, communication techniques such as a wireless LAN (Local Area Network) have been developed. As a major communication standard of the wireless LAN, the IEEE (Institute of Electrical and Electronics Engineers) 802.11 standard series is known. The IEEE802.11 standard series includes standards such as IEEE802.11a/b/g/n/ac/ax. For example, in the latest standard, IEEE802.11ax, a technique that uses OFDMA (Orthogonal Frequency-Division Multiple Access) to implement a high peak throughput of up to 9.6 gigabits per second (Gbps) and additionally improve the communication speed under a congestion situation has been standardized (see Japanese Patent Laid-Open No. 2018-050133).

On the other hand, in order to further improve throughput, a study group called IEEE802.11EHT (Extremely High Throughput) has been formed as a successor standard of IEEE802.11ax. In IEEE802.11EHT, introduction of a NOMA (Non-Orthogonal Multiple Access) scheme is being studied to improve throughput.

A communication device that has received a radio frame can execute radio signal processing corresponding to NOMA by recognizing that NOMA is used in the radio frame. However, since NOMA is not used in the conventional standards, there is no mechanism for the communication device to recognize whether NOMA is used in the radio frame.

SUMMARY OF THE INVENTION

The present invention provides a technique that enables clear recognition as to whether NOMA is used in a radio frame.

According to one aspect of the present invention, there is provided a communication device comprising a communication unit configured to transmit or receive a radio frame including a preamble and a data field of a physical layer (PHY), wherein the preamble includes an L-STF (Legacy Short Training Field), an L-LTF (Legacy Long Training Field), an L-SIG (Legacy Signal Field), an EHT-SIG (Extremely High Throughput Signal Field), an EHT-STF (EHT Short Training Field), and an EHT-LTF (EHT Long Training Field), and the EHT-SIG includes a subfield in which information on whether NOMA (Non-Orthogonal Multiple Access) is used in transmission of data included in the data field is set.

According to another aspect of the present invention, there is provided an information processing device comprising a generation unit configured to generate a radio frame including a preamble and a data field of a physical layer (PHY), wherein the preamble includes an L-STF (Legacy Short Training Field), an L-LTF (Legacy Long Training Field), an L-SIG (Legacy Signal Field), an EHT-SIG (Extremely High Throughput Signal Field), an EHT-STF (EHT Short Training Field), and an EHT-LTF (EHT Long Training Field), and the EHT-SIG includes a subfield in which information on whether NOMA (Non-Orthogonal Multiple Access) is used in transmission of data included in the data field is set.

Further features of the present invention will become apparent from the following description of exemplary embodiments (with reference to the attached drawings).

DESCRIPTION OF THE EMBODIMENTS

Figure 1:
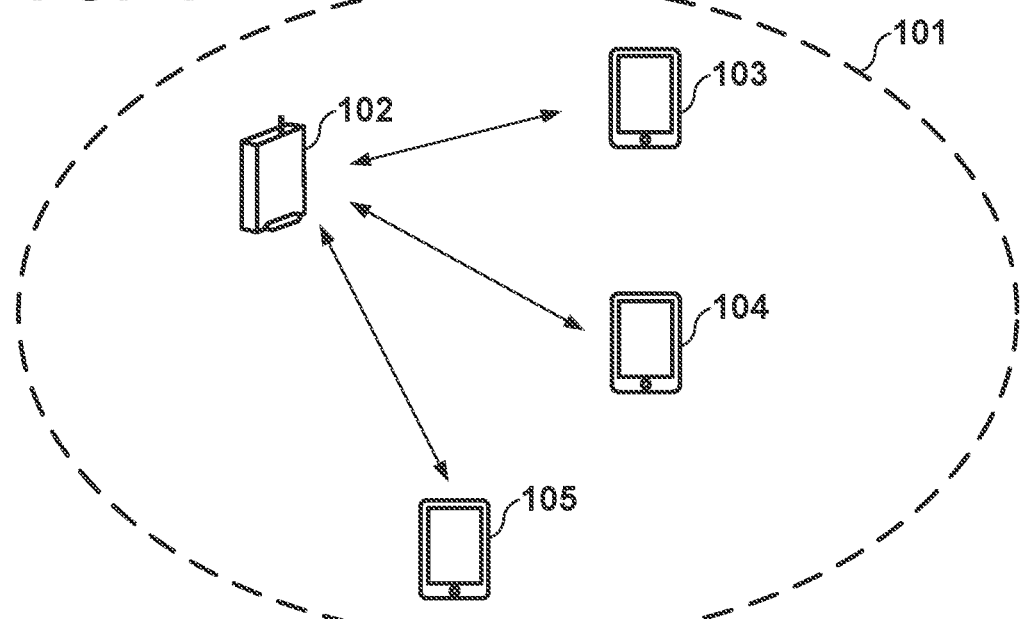
FIG. 1 is a view showing a configuration example of a network.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

(Network Configuration)

FIG. 1 shows a configuration example of a wireless communication network according to this embodiment. This wireless communication network includes one access point (AP) and three stations (STAs). Here, each of an AP 102 and STAs 103 to 105 complies with IEEE802.11EHT (Extremely High Throughput), and is configured to be capable of performing wireless communication complying with standards defined before the IEEE802.11EHT standard. Note that the name "IEEE802.11EHT" is provided for convenience, and can be another name when the standard was established, but this specification and the appended claims are to cover all the standards that can support the processing to be described later. Further, it may be understood that EHT is an acronym of Extreme High Throughput.

In the following description, in a case in which a specific device is not referred to or the like, the access point may be referred to as "AP" and the station (terminal) may be referred to as "STA" without reference numerals. Note that in FIG. 1, the wireless communication network including one AP and three STAs is shown as an example, but the numbers of these communication devices may be more or less than shown. In an example, no AP may exist when the STAs communicate with each other. In addition, the AP 102 may be a group owner complying with the Wi-Fi® Direct standard, and the STAs 103 to 105 may be clients of the Wi-Fi Direct standard. In FIG. 1, the communicable area of the network formed by the AP 102 is indicated by a circle 101. Note that this communicable area may cover a larger area, or may cover only a smaller area.

In this embodiment, it is assumed that a NOMA scheme can be used to transmit and receive data between the AP 102 and the STAs 103 to 105. NOMA is an acronym of Non-Orthogonal Multiple Access. In communication using the NOMA scheme, a plurality of independent signals (not orthogonal to each other) to each of which power is appropriately assigned are transmitted in parallel at the same time using a common frequency channel. Thus, the radio resource is effectively used, and the overall system throughput can be improved.

(Arrangement of Device)

Figure 2:
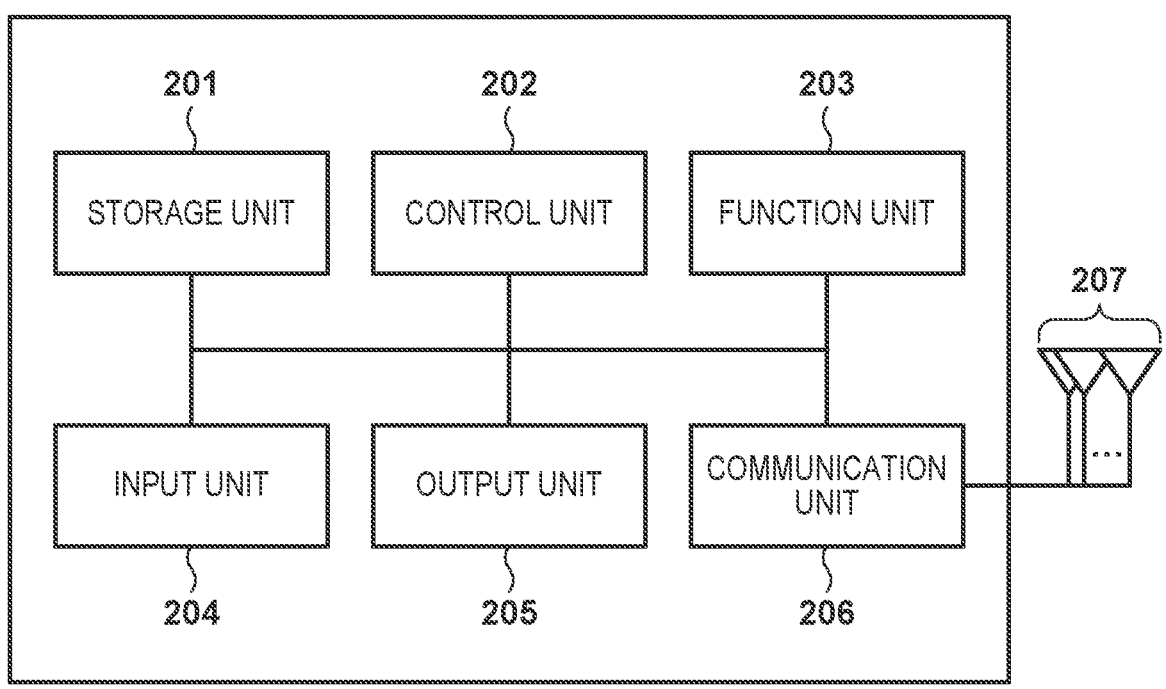
FIG. 2 is a block diagram showing an example of the hardware arrangement of a communication device.

FIG. 2 shows an example of the hardware arrangement of each of the communication devices (AP and STAs). The communication device includes, as an example of its arrangement, a storage unit 201, a control unit 202, a function unit 203, an input unit 204, an output unit 205, a communication unit 206, and an antenna 207.

The storage unit 201 is formed by one or more memories, that is, both of a ROM and a RAM or one of them, and stores programs for performing various kinds of operations to be described later and various kinds of information such as communication parameters for wireless communication. Note that other than the memories such as a ROM and a RAM, a storage medium such as a flexible disk, a hard disk, an optical disk, a magnetooptical disk, a CD-ROM, a CD-R, a magnetic tape, a non-volatile memory card, or a DVD may be used as the storage unit 201.

The control unit 202 is formed by, for example, one or more processors such as a CPU and an MPU, an ASIC (Application Specific Integrated Circuit), a DSP (Digital Signal Processor), an FPGA (Field Programmable Gate Array), or the like. Note that the processor may be a single-core processor or a multicore processor. Here, CPU is an acronym of Central Processing Unit, and MPU is an acronym of Micro Processing Unit. The control unit 202 executes the programs stored in the storage unit 201, thereby controlling the entire device. Note that the control unit 202 may control the entire device by cooperation of the programs stored in the storage unit 201 and an OS (Operating System).

In addition, the control unit 202 controls the function unit 203 to execute a predetermined process such as image capturing, printing, or projection. The function unit 203 is hardware used by the device to perform a predetermined process. For example, if the device is a camera, the function unit 203 is an image capturing unit and performs an image capturing process. For example, if the device is a printer, the function unit 203 is a printing unit and performs a printing process. For example, if the device is a projector, the function unit 203 is a projection unit and performs a projection process. Data to be processed by the function unit 203 may be data stored in the storage unit 201, or may be data communicated with another AP or STA via the communication unit 206 to be described later.

The input unit 204 accepts various kinds of operations from a user. The output unit 205 performs various kinds of outputs for the user. Here, the output by the output unit 205 includes, for example, at least one of display on a screen, audio output by a loudspeaker, vibration output, and the like.

Note that both the input unit 204 and the output unit 205 may be implemented by one module, like a touch panel.

The communication unit 206 controls wireless communication complying with the IEEE802.11 standard series, or controls IP (Internet Protocol) communication. The communication unit 206 is a so-called radio chip, and may itself include one or more processors and memories. In this embodiment, the communication unit 206 can execute processing complying with at least the IEEE802.11EHT standard. In addition, the communication unit 206 controls the antenna 207 to transmit and receive radio signals for wireless communication. The device communicates contents such as image data, document data, or video data with another communication device via the communication unit 206. The antenna 207 is an antenna that can transmit and receive signals in at least any one of, for example, a sub-GHz band, 2.4 GHz band, 5 GHz band, and 6 GHz band. Note that the frequency band (and a combination of frequency bands) to which the antenna 207 is adaptable is not particularly limited. The antenna 207 may be one antenna, or may be a set of two or more antennas to perform MIMO (Multi-Input and Multi-Output) transmission/reception as shown in FIG. 2. In addition, the antenna 207 may be formed by two or more antennas (two or more sets of antennas) that are adaptable to different frequency bands, for example.

(Frame Structure)

Figure 3:
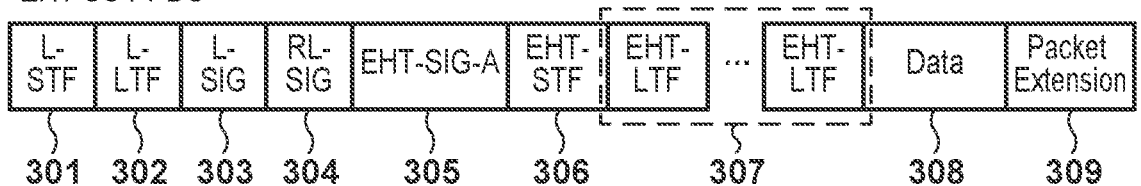
FIG. 3 is a view showing an example of the PHY frame structure of an EHT SU PPDU.
Figure 4:
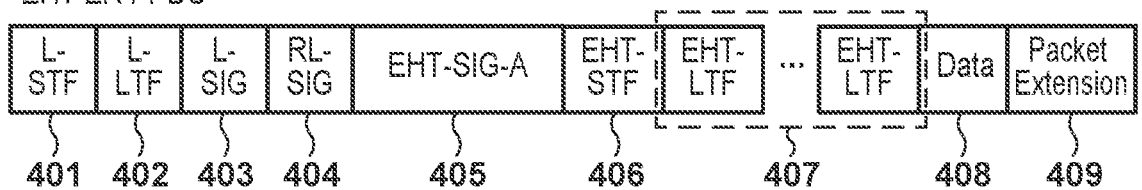
FIG. 4 is a view showing an example of the PHY frame structure of an EHT ER SU PPDU.
Figure 5:
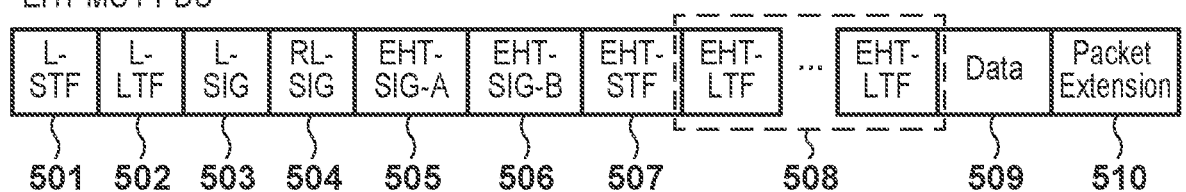
FIG. 5 is a view showing an example of the PHY frame structure of an EHT MU PPDU.

Each of FIGS. 3 to 5 shows an example of a radio frame (PPDU) (Physical layer (PHY) Protocol Data Unit) defined by the IEEE802.11EHT standard. FIG. 3 shows an example of an EHT SU (Single User) PPDU which is a PPDU for single-user communication. FIG. 4 shows an example of an EHT ER (Extended Range) SU PPDU for long distance transmission. The EHT ER SU PPDU is used when the communication range should be extended in communication between an AP and a single STA. FIG. 5 shows an example of an EHT MU (Multi User) PPDU for multi-user communication.

The PPDU includes fields including an STF (Short Training Field), an LTF (Long Training Field), and a SIG (Signal Field). As shown in FIG. 3, the PPDU head portion includes an L (Legacy)-STF 301, an L-LTF 302, and an L-SIG 303 for ensuring backward compatibility with the IEEE802.11a/b/g/n/ax standards. Note that each of frame formats shown in FIGS. 4 and 5 includes an L-STF (L-STF 401 or 501), an L-LTF (L-LTF 402 or 502), and an L-SIG (L-SIG 403 or 503). Note that the L-LTF is arranged immediately after the L-STF, and the L-SIG is arranged immediately after the L-LTF. Note that each of the structures shown in FIGS. 3 to 5 includes an RL-SIG (Repeated L-SIG) (RL-SIG 304, 404, or 504) arranged immediately after the L-SIG. In the RL-SIG field, the contents of the L-SIG are repeatedly transmitted. The RL-SIG is used to enable a receiver to recognize that this PPDU complies with a standard after the IEEE802.11ax standard, and may be omitted in IEEE802.11EHT in some cases. In addition, a field for enabling the receiver to recognize that this PPDU complies with the IEEE802.11EHT may be provided in place of the RL-SIG.

The L-STF 301 is used for detection of a physical layer (PHY) frame signal, AGC (Automatic Gain Control), timing detection, or the like. The L-LTF 302 is used for highly accurate frequency/time synchronization, obtainment of propagation channel information (CSI: Channel State Information), or the like. The L-SIG 303 is used for transmitting control information including information such as a physical layer data rate, an MCS (Modulation and Coding Scheme), and a PHY frame length. A legacy device (Non-EHT device)

complying with the IEEE802.11a/b/g/n/ax standards can decode the above-described various kinds of legacy fields.

Each PPDU further includes one or more EHT-SIGs (EHT-SIG-A 305, EHT-SIG-A 405, or EHT-SIG-A 505 and EHT-SIG-B 506) arranged immediately after the RL-SIG and used for transmitting control information for EHT. The EHT-SIG field is used for EHT PPDU reception processing. Each PPDU further includes an STF for EHT (EHT-STF 306, 406, or 507) and an LTF for EHT (EHT-LTF 307, 407, or 508). Each PPDU includes, after these controlling fields, a data field 308, 408, or 509 and a Packet Extension field 309, 409, or 510. The portion including the fields from the L-STF to the EHT-LTF of each PPDU is referred to as a PHY preamble. Note that the respective fields of each PPDU may not necessarily be arranged in the order shown in each of FIGS. 3 to 5, or may include a new field not shown in each of FIGS. 3 to 5.

Note that each of FIGS. 3 to 5 shows the PPDU that can ensure the backward compatibility as an example. However, if it is unnecessary to ensure the backward compatibility, for example, the legacy fields may be omitted. In this case, for example, the EHT-STF and EHT-LTF are used in place of the L-STF and the L-LTF to establish synchronization. Then, the EHT-STF and one of EHT-LTFs after the EHT-SIG field can be omitted.

Each of the EHT-SIG-A 305 included in the EHT SU PPDU and the EHT-SIG-A 405 included in the EHT ER SU PPDU includes an EHT-SIG A1 shown in Table 1 and an EHT-SIG-A2 shown in Table 2 which are necessary for reception of the PPDU. In this embodiment, a "NOMA" subfield, which indicates whether NOMA is used in transmission of data included in the data field of its PPDU, is included in at least any one of the EHT-SIG-A1 and the EHT-SIG-A2. For example, if the NOMA subfield is set in the EHT-SIG-A1, no NOMA subfield may be set in the EHT-SIG-A2. Further, if the NOMA subfield is set in the EHT-SIG-A2, no NOMA subfield may be set in the EHT-SIG-A1. Furthermore, the NOMA subfields may be set in both of the EHT-SIG-A1 and the EHT-SIG-A2. The EHT-SIG-A 505 of the EHT MU PPDU shown in FIG. 5 includes an EHT-SIG-A1 shown in Table 3 and an EHT-SIG-A2 shown in Table 4, which are necessary for reception of the PPDU. In the EHT MU PPDU of this embodiment, the NOMA field as described above is included in the EHT-SIG-A2. Then, for example, "1" is set in the NOMA subfield if NOMA is used, or "0" is set in the NOMA subfield if NOMA is not used. However, this is merely an example, and conversely, "0" may be set in the NOMA subfield if NOMA is used, or "1" may be set in the NOMA subfield if NOMA is not used. Note that if a value indicating that NOMA is used is set in the NOMA subfield, this indicates that data included in the subsequent data field is multiplexed using the NOMA scheme. On the other hand, if a value indicating that NOMA is not used is set in the NOMA subfield, this indicates that data included in the subsequent data field is not multiplexed using the NOMA scheme. According to this, the communication device that transmits the PPDU including the EHT-SIG field can inform the communication device that receives this PPDU of information related to NOMA without changing the frame format.

Note that the structure shown in each of Tables 1 to 4 is merely an example, and another structure may be used. For example, in the EHT SU PPDU and the EHT ER SU PPDU, information related to NOMA may be informed at a position other than the 15th bit of each of the EHT-SIG-A1 field and the EHT-SIG-A2 field. Similarly, in the EHT MU PPDU, information related to NOMA may be informed at a position other than the eighth bit of the EHT-SIG A2 field. In addition, the name and contents of each field may be different from those shown in Tables 1 to 4.

TABLE 1

| | Bit Position | Subfield | Bit Count | Description |
|---|---|---|---|---|
| EHT-SIG-A1 | B0 | Format | 1 | "1" is set for an EHT PPDU and an EHT ER PPDU to distinguish them from an EHT TB PPDU. |
| | B1 | Beam Change | 1 | "1" is set if the pre-EHT of the PPDU is arranged in a space different from the first symbol of the EHT-LTF, or "0" is set if the pre-EHT is mapped similarly to the first symbol. |
| | B2 | UL/DL | 1 | This subfield indicates whether the PPDU is for UL or DL, and has the same value as TXVECTOR UPLINK_FLAG. |
| | B3-B6 | MCS | 4 | This subfield indicates the value of the Modulation and Coding Scheme. In a case of an EHT SU PPDU, n = 0, 1, 2, . . . , 11 (12 to 15 are reserved). In a case of an EHT ER SU PPDU and Bandwidth = 0, n = 0, 1, 2 (3 to 15 are reserved areas). In a case of an EHT ER SU PPDU and Bandwidth = 1, n = 0 for MCS 0 (1 to 15 are reserved areas). |
| | B7 | DCM | 1 | This subfield indicates whether Dual Carrier Modulation is applied to the data field. If "0" is set in the STBC field, "1" is set. (If both the DCM and STBC fields are "1", neither of them is applied) If DCM is not applied, "0" is set. |
| | B8-B13 | BSS Color | 6 | 6-bit number for identifying the BSS |
| | B14 | NOMA | 1 | If multiplexing using the NOMA scheme is performed, "1" is set. If multiplexing using the NOMA scheme is not performed, "0" is set. |

TABLE 1-continued

| Bit Position | Subfield | Bit Count | Description |
|---|---|---|---|
| B15-B18 | Spatial Reuse | 4 | This subfield indicates whether Spatial Reuse is allowed during transmission of this PPDU. The value of Spatial Reuse field encoding shown in the separate table is set. |
| B19-B20 | Bandwidth | 2 | In a case of an EHT SU PPDU: "0" is set for 20 MHz, "1" is set for 40 MHz, "2" is set for 80 MHz, or "3" is set for 160 MHz (80 + 80 MHz). In a case of an EHT ER SU PPDU: "0" is set for 242-tone RU, or "1" is set for upper 106-tone RU of 20 MHz. |
| B21-B22 | GI + LTF Size | 2 | This subfield indicates the Guard Interval period and the EHT-LTF size. "0" is set for 1×EHT-LTF and 0.8 μs GI, "1" is set for 2×EHT-LTF and 0.8 μs GI, "2" is set for 2×EHT-LTF and 1.6 μs GI, "3" is set if both the DCM and STBC fields are "1" and for 4×EHT-LTF and 0.8 μs GI, or "3" is set for 4×EHT-LTF other than the above case and 3.2 μs GI. |
| B23-B25 | NSTS And Midamble Periodicity | 3 | This subfield indicates the number of space-time streams and the midamble period for frame synchronization. If the Doppler field is "0", "(the number of space-time streams) − 1" is set. If the Doppler field is "1", B23 and B24 indicate the number of space-time streams. B25 is "0" if the midamble period is 10, or "1" if the midamble period is 20. |

TABLE 2

| | Bit Position | Subfield | Bit Count | Description |
|---|---|---|---|---|
| EHT-SIG-A2 | B0-B6 | TXOP | 1 | Transmission Opportunity If TXOP_DURATION of TXVECTOR is UNSPECIFIED and there is no period information, 127 is set. If TXOP_DURATION of TXVECTOR is smaller than 512, a value smaller than 127 is set to set NAV. At this time, if B0 is "0", FLOOR of TXOP_DURATION/8 (round down) is set in B1 to B6. If B0 is "1", FLOOR of (TXOP_DURATION - 512)/8 is set in B1 to B6. |
| | B7 | Coding | 1 | "0" is set for BCC (Binary Convolutional Code), or "1" is set for LDPC (Low Density Parity Check). |
| | B8 | LDPC Extra Symbol Segment | 1 | This subfield indicates the presence/absence of an extra OFDM symbol segment for LDPC. |
| | B9 | STBC | 1 | "1" is set in this field if STBC (Space-Time Block Coding) is used and the DCM subfield is "0", "1" is also set if neither DCM nor STBC is applied, or "0" is set otherwise. |
| | B10 | Beamformed | 1 | "1" is set if beamforming steering is applied to the waveform of SU transmission. |
| | B11-B12 | Pre-FEC Padding Factor | 2 | "0" is set if the Pre-FEC Padding Factor is 4, "1" is set if the Pre-FEC Padding Factor is 1, "2" is set if the Pre-FEC Padding Factor is 2, or "3" is set if the Pre-FEC Padding Factor is 3. |
| | B13 | PE Disambiguity | 1 | Disambiguity field of Packet Extension |
| | B14 | NOMA | 1 | If multiplexing using the NOMA scheme is performed, "1" is set. If multiplexing using the NOMA scheme is not performed, "0" is set. |
| | B15 | Doppler | 1 | "1" is set if either of the following conditions is met: the number of OFDM symbols in the data field is larger than" the value indicated by the midamble period + 1", and a midamble exists, and |

TABLE 2-continued

| Bit Position | Subfield | Bit Count | Description |
|---|---|---|---|
| | | | the number of OFDM symbols in the data field is equal to or smaller than "the value indicated by the midamble period + 1", no midamble exists, and the channel changes rapidly. |
| B16-B19 | CRC | 4 | The CRC of the EHT-SIG-A (26 bits of A1 and 16 bits up to B15 of A2, that is, 42 bits in total) field up to here. |
| B20-B25 | Tail | 6 | An area to set "0" to indicate the end portion to a trellis convolution decoder. |

TABLE 3

| | Bit Position | Subfield | Bit Count | Description |
|---|---|---|---|---|
| EHT-SIG-A1 | B0 | UL/DL | 1 | This subfield indicates whether the PPDU is for UL or DL, and has the same value as TXVECTOR UPLINK_FLAG. |
| | B1-B3 | SIGB MCS | 3 | This subfield indicates the MCS of the EHT-SIG-B field. "0" is set for MCS 0, "1" is set for MCS 1, "2" is set for MCS 2, "3" is set for MCS 3, "4" is set for MCS 4, or "5" is set for MCS 5. "6" and "7" are reserved areas. |
| | B4 | SIGB DCM | 1 | "1" is set if the HT-SIG-B field is modulated using DCM. |
| | B5-B10 | BSS Color | 6 | 6-bit number for identifying the BSS |
| | B11-B14 | Spatial Reuse | 4 | This subfield indicates whether Spatial Reuse is allowed during transmission of this PPDU. The value of Spatial Reuse field encoding shown in the separate table is set. |
| | B15-B17 | Bandwidth | 3 | "0" is set for 20 MHz, "1" is set for 40 MHz, "2" is set for 80 MHz, or "3" is set for 160 MHz (80 + 80 MHz). When the SIGB Compression field is "0", "4" is set if only the secondary 20 MHz is puncturing in 80 MHz preamble puncturing, "5" is set if two 20 MHz of the secondary 40 MHz are puncturing in 80 MHz preamble puncturing, "6" is set if only the secondary 20 MHz is puncturing in 160 (or 80 + 80) MHz preamble puncturing, or "7" is set if only the secondary 40 MHz is puncturing in 160 (or 80 + 80) MHz preamble puncturing. If the SIGB field is "1", the value between "4" to "7" means "reserved". |
| | B18-B21 | Number of EHT-SIG-B Symbols or MU-MIMO Users | 4 | When the SIGB Compression field is "0", this subfield indicates the number of OFDMA symbols in the EHT-SIG-B. If the number of OFDM symbols in the EHT-SIG-B is smaller than 16, the number obtained by subtracting 1 from the number of OFDM symbols in the EHT-SIG-B is set. If at least one receiving terminal has set the capability of supporting the number of EHT SIG-B OFDM symbols larger than 16 to "0", "15" is set to indicate that the number of OFDM symbols in the EHT-SIG-B is 16. If all the receiving terminals have set the capability of supporting the number of EHT SIG-B OFDM symbols larger than 16 to "0" and the data rate of the EHT-SIG-B is smaller than MCS 4 which does not use DCM, "15" is set to indicate that the number of OFDM symbols in the EHT-SIG-B is equal to or larger than 16. When the SIGB Compression field is "1", the value set here means the number obtained by subtracting 1 from the number of MU-MIMO users. |
| | B22 | SIG Compression | 1 | "1" is set if a Common field exists in the EHT-SIG-B. This subfield indicates the Guard Interval |

TABLE 3-continued

| Bit Position | Subfield | Bit Count | Description |
|---|---|---|---|
| B23-B24 | Gi + LTF Size | 2 | period and the EHT-LTF size. "0" is set for 4×EHT-LTF and 0.8 μs GI, "1" is set for 2×EHT-LTF and 0.8 μs GI, "2" is set for 2×EHT-LTF and 1.6 μs GI, or "3" is for 4×EHT-LTF and 3.2 μs GI. |
| B25 | Doppler | 1 | "1" is set if either of the following conditions is met: the number of OFDM symbols in the data field is larger than "the value indicated by the midamble period + 1", and a midamble exists, and the number of OFDM symbols in the data field is equal to or smaller than "the value indicated by the midamble period + 1", no midamble exists, and the channel changes rapidly. |

TABLE 4

| | Bit Position | Subfield | Bit Count | Description |
|---|---|---|---|---|
| EHT-SIG-A2 | B0-B6 | TXOP | 1 | Transmission Opportunity. If TXOP_DURATION of TXVECTOR is UNSPECIFIED and there is no period information, 127 is set. If TXOP_DURATION of TXVECTOR is smaller than 512, a value smaller than 127 is set to set NAV. At this time, if B0 is "0", FLOOR of TXOP_DURATION/8 (round down) is set in B1 to B6. If B0 is "1", FLOOR of (TXOP_DURATION - 512)/8 is set in B1 to B6. |
| | B7 | NOMA | 1 | If multiplexing using the NOMA scheme is performed, "1" is set. If multiplexing using the NOMA scheme is not performed, "0" is set. |
| | B8-B10 | Number of EHT-LTF Symbols And Midamble Periodicity | 3 | This subfield indicates the number of EHT-LTFs. "0" is set for one EHT-LTF, "1" is set for two EHT-LTFs, "2" is set for four EHT-LTFs, "3" is set for six EHT-LTFs, or "4" is set for eight EHT-LTFs. When the Doppler field is "1", B8 and B9 indicate the number of EHT-LTF symbols, and B10 indicates the midamble period. |
| | B11 | LDPC Extra Symbol Segment | 1 | This subfield indicates the presence/absence of an extra OFDM symbol segment for LDPC. |
| | B12 | STBC | 1 | When the number of users of each RU (Resource Unit) is not larger than 1, "1" is set to indicate that STBC is used for encoding. |
| | B13-B14 | Pre-FEC Padding Factor | 2 | "0" is set if the Pre-FEC Padding Factor is 4, "1" is set if the Pre-FEC Padding Factor is 1, "2" is set if the Pre-FEC Padding Factor is 2, or "3" is set if the Pre-FEC Padding Factor is 3. |
| | B15 | PE Disambiguity | 1 | Disambiguity field of Packet Extension |
| | B16-B19 | CRC | 4 | The CRC of the EHT-SIG-A (26 bits of A1 and 16 bits up to B15 of A2, that is, 42 bits in total) field up to here. |
| | B20-B25 | Tail | 6 | An area to set "0" to indicate the end portion to a trellis convolution decoder. |

Note that each PPDU may include a separate field in addition to, for example, the EHT-SIG-A field described above. Here, this field is referred to as an EHT-SIG-x field. The EHT-SIG-x field can include subfields used to designate parameters related to the NOMA scheme. The EHT-SIG-x field may further include another information. An example of information stored in the EHT-SIG-x field is shown in Table 5.

TABLE 5

| Subfield | | Description |
|---|---|---|
| EHT-SIG-x | NOMA | This subfield indicates whether multiplexing using the NOMA scheme is performed. |
| Destination_0 | ID | Identifier of Destination_0 |
| | SIC | Necessity of SIC for Destination_0 |
| | MCS | MCS corresponding to Destination_0 |
| | Tx power | Transmission power to Destination_0 |
| Destination_1 | ID | Identifier of Destination_1 |
| | SIC | Necessity of SIC for Destination_1 |
| | MCS | MCS corresponding to Destination_1 |
| | Tx power | Transmission power to Destination_1 |

The EHT-SIG-x can include the NOMA subfield which has been described to be stored in the EHT-SIG-A. Note that if the NOMA subfield is set in the EHT-SIG-x, the NOMA subfield may be set or not set in the EHT-SIG-A described above.

The EHT-SIG-x can include one structured subfield for each data destination. Hereinafter, this subfield is referred to as a Destination_y subfield (where y is an integer of 0 or more). One Destination_y subfield may be formed by one OFDM symbol, or may be formed by a plurality of OFDM symbols. Each of one or more Destination_y subfields can include a field indicating the ID (identifier) of the destination STA, a field indicating the necessity of SIC (Successive Interference Cancellation), a field indicating the index of the MCS (Modulation and Coding Scheme) to be used, and a field indicating the transmission power. Hereinafter, these fields are referred to as an ID field, an SIC field, an MCS field, and a TX power field, respectively.

The ID field is a field of the number of bits (for example, 11 bits) capable of identifying the STA, and the identifier of the STA corresponding to this Destination_y subfield is stored therein. Note that in place of the identifier of the STA, the identifier of a group including one or more STAs may be stored in the ID field.

The SIC field is a field that indicates whether application of SIC (Successive Interference Cancellation) is necessary, and configured to be a field of 1 bit or more. For example, if the SIC field is formed by 1 bit, the communication device that transmits the PPDU stores "1" in the SIC field to indicate that the STA corresponding to this Destination_y subfield needs to use SIC. In addition, the communication device stores "0" in the SIC field to indicate that the STA corresponding to this Destination_y subfield need not use SIC.

The MCS field is a field of the number of bits capable of uniquely specifying the MCS that can be used in data transmission using the NOMA scheme in the EHT standard. For example, the MCS field is configured as a field of ceil{log 2(the number of MCS types that can be used in data transmission using the NOMA scheme)} bits. Here, ceil(x) is a ceiling function that takes x as an argument, and is a function that returns the smallest integer equal to or larger than x. If the number of MCS types used in data transmission using the NOMA scheme is equal to the number of MCS types used when the MOMA scheme is not used, the number of bits of the MCS field can be 4 bits or more, or 5 bits or more. On the other hand, if the number of MCS types used in data transmission using the NOMA scheme is smaller than the number of MCS types used when the NOMA scheme is not used, the number of bits in the MCS field can be 4 bits or less. In addition, if the MCS field indicates only the primary modulation scheme, the MCS field can be configured as a field of the number of bits capable of uniquely specifying the primary modulation scheme that can be used in data transmission using the NOMA scheme in the EHT standard. The minimum number of bits in this case is expressed by ceil{log 2(the number of types of the primary modulation schemes that can be used in data transmission using the NOMA scheme)}. For example, if seven primary modulation schemes, BPSK, QPSK, 16QAM, 64QAM, 256QAM, 1024QAM, and 4096QAM, can be used, the MCS field can be configured as a minimum 3-bit field. On the other hand, if only two primary modulation schemes, BPSK and QPSK, can be used, the minimum number of bits of the MCS field is 1 bit. If only three primary modulation schemes, BPSK, QPSK, and 16QAM, can be used, the minimum number of bits of the MCS field is 2 bits.

The TX power field indicates a ratio of power assigned to the STA (or STA group) corresponding to this Destination_y subfield to the transmission power of the data included in the data field. This field may indicate the absolute value of the power assigned to the STA or STA group corresponding to this Destination_y subfield, or may indicate the relative value of the power required to execute SIC. In addition, the power may be indicated in another format such as an index corresponding to the absolute value of the power. The power value may be indicated as a floating point constant or an integer constant. In these cases, the number of bits of the TX power field can be, for example, 8 bits, 16 bits, 32 bits, or 64 bits. The power value may be indicated by being encoded into a smaller number of bits. For example, when the TX power field indicates the ratio of power assigned to the STA or STA group corresponding to this Destination_y subfield, the minimum value of the number of bits can be ceil{log 2(the number of types of ratios)}. For example, if there are nine types of ratios expressed by $0.1+0.1*i$ ($i=0, 1, \ldots, 8$), the TX power field can be configured as a minimum 4-bit field.

Note that these parameters are merely examples, and only some of them may be stored in each Destination_y subfield, or a value indicating a parameter other than these parameters may be stored in each Destination_y subfield. In addition, if the parameters related to the NOMA scheme are predetermined fixed values or if such parameters are not used in reception processing, no field indicating the parameters related to the NOMA scheme may exist.

Note that although not shown, the EHT-SIG-B of the EHT MU PPDU includes information of a Common field or a User Block field necessary for receiving the PPDU. In this case, for example, information of the EHT-SIG-x as described above may be stored in the User Block field that can store information for each user (receiving device). That is, information for each receiving device such as the ID, SIC, MCS, and TX power as described above can be transmitted and received using the User Block field. Further, the NOMA subfield for indicating whether NOMA is used may be set in the Common field.

Furthermore, the NOMA subfield may be set in the User Block field, and whether NOMA is used may be set for each receiving device. For example, NOMA may be used not for a spatially-separable receiving device, but for two or more receiving devices for which spatial separation is difficult or sufficient quality cannot be obtained by spatial separation.

The communication device that has received the PPDU as described above can check whether NOMA is used based on the NOMA field, and obtain parameters related to the NOMA scheme. Then, the communication device can use the obtained parameters to separate data multiplexed using the NOMA scheme from another data and demodulate the separated data.

(Procedure of Processing)

Figure 6:
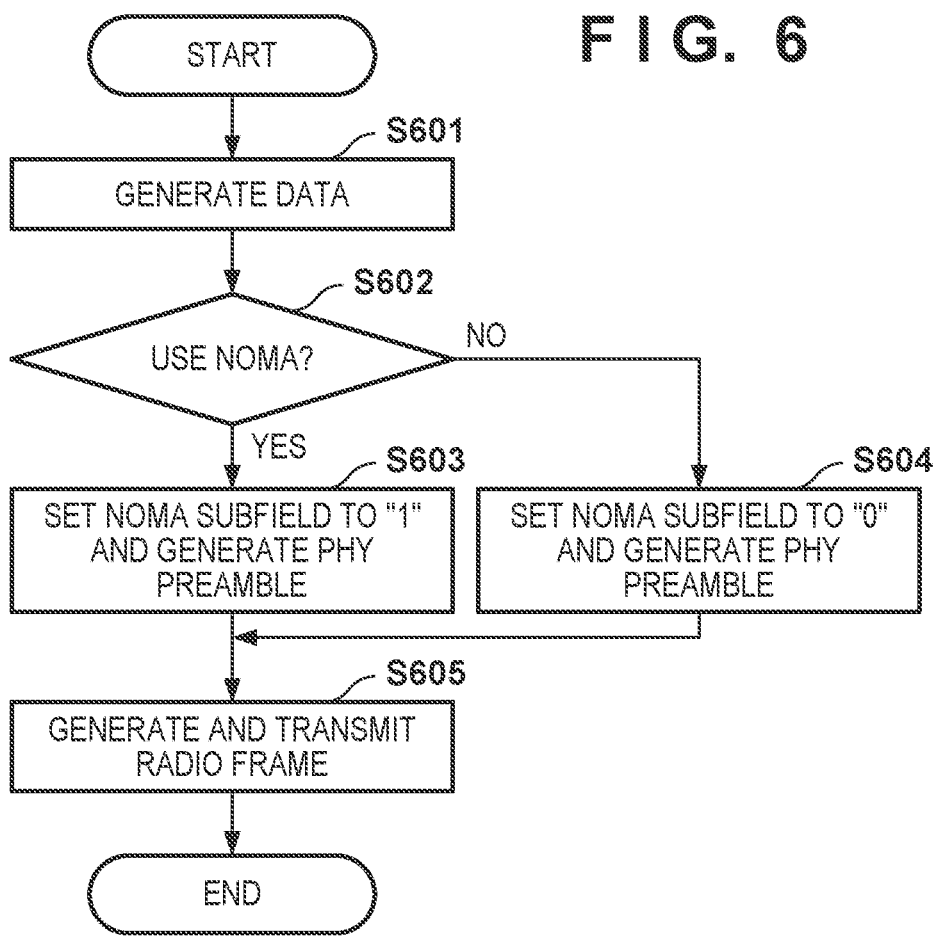
FIG. 6 is a flowchart illustrating an example of the procedure of processing executed by a communication device that transmits a PPDU.

Next, an example of the procedure of processing executed by a communication device (transmitting device) that transmits a radio frame will be described with reference to FIG. 6. This processing is implemented by the control unit 202 reading out and executing a program stored in the storage unit 201 of the transmitting device. The control unit 202 of the transmitting device generates data to be included in the data field (step S601). Then, the transmitting device determines whether to use NOMA to multiplex the data field of the PPDU to be transmitted (step S602). If it is determined that NOMA is used (YES in step S602), the communication device sets the value of the NOMA subfield of the EHT-SIG field to "1", and generates a PHY preamble (step S603). On the other hand, if it is determined that NOMA is not used (NO in step S602), the communication device sets the value of the NOMA subfield of the EHT-SIG field to "0", and generates a PHY preamble (step S604). The communication unit 206 of the transmitting device generates a radio frame including the data generated in step S601 and the PHY preamble generated in one of steps S603 and S604, and transmits the generated radio frame via the antenna 207 (step S605).

Figure 7:
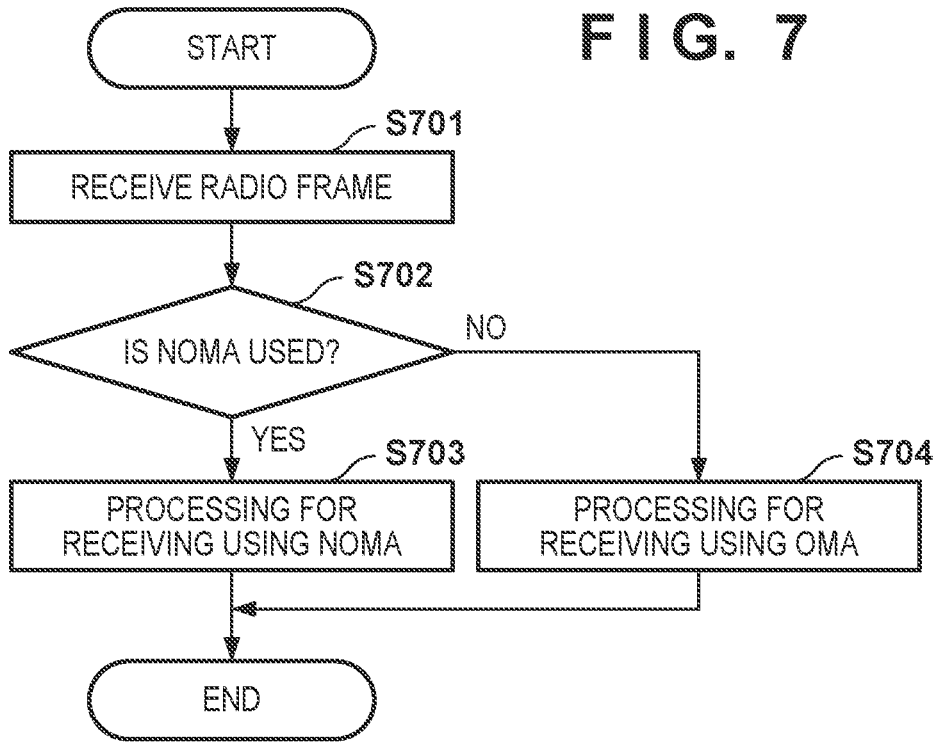
FIG. 7 is a flowchart illustrating an example of the procedure of processing executed by a communication device that receives a PPDU.

Next, an example of the procedure of processing executed by a communication device (receiving device) that receives a radio frame will be described with reference to FIG. 7. This processing is implemented by the control unit 202 reading out and executing a program stored in the storage unit 201 of the receiving device. The communication unit 206 of the receiving device receives, from a transmitting device, an EHT PPDU having the frame structure described above (step S701). Then, at least one of the communication unit 206 and the control unit 202 of the receiving device refers to the NOMA subfield included in the EHT-SIG of the PHY preamble to determine whether NOMA is used to multiplex data (step S702). If it is determined that NOMA is used (YES in step S702), the receiving device executes receiving processing such as separation and demodulation of data using the NOMA scheme (step S703).

For example, the receiving device refers to the ID field in the Destination_y subfield to specify the Destination_y subfield corresponding to the self-device. Then, the receiving device refers to the SIC field in the Destination_y subfield corresponding to the self-device. If a value indicating that SIC is necessary is stored in the SIC field, the receiving device executes a successive interference cancellation procedure based on the value of the MCS field in the Destination_y subfield corresponding to another receiving device to obtain data addressed to the self-device. That is, for example, the receiving device executes demodulation or the like of the signal components addressed to the other receiving device using the modulation scheme or the like of the other receiving device, and subtracts a replica of the signal components from the received signal, thereby obtaining the signal components obtained by canceling the signal components addressed to the other receiving device. By repeatedly executing such signal component cancellation of the signal components addressed to the other major communication device (for example, the other communication device having higher transmission power than the self-device), the receiving device can obtain the signal components mainly including the signal components addressed to the self-device. By using the signal components obtained as a result of cancelation of the signal components addressed to the other receiving device, the receiving device can execute processing such as demodulation in a state in which the influence of interference has been eliminated. At this time, the receiving device may refer to the TX power fields in the Destination_y subfields respectively corresponding to the self-device and the other receiving device. Then, for example, by using the values in these fields, the size of the pilot signal of the signal to be canceled may be corrected. This makes it possible to more accurately equalize, demodulate, and cancel the signal to be canceled. Note that if the value of the SIC field in the Destination_y subfield corresponding to the self-device indicates that SIC is unnecessary, the receiving device obtains data addressed to the self-device without performing SIC. Note that at this time, the receiving device may also refer to the TX power fields in the Destination_y subfields respectively corresponding to the self-device and the other receiving device. Then, for example, by using the values in these fields, the size of the pilot signal may be corrected. This makes it possible to more accurately equalize, demodulate, and cancel the signal. Note that if predetermined parameters are used or if the predetermined procedure is used, the receiving device can execute receiving processing for obtaining data addressed to the self-device without referring to these parameters.

If it is determined that NOMA is not used (NO in step S702), the receiving device executes receiving processing such as separation and modulation of data using a scheme (for example, OMA (Orthogonal Multiple Access) scheme) different from the NOMA scheme to obtain data addressed to the self-device (step S704). Based on the data obtained in this manner, the receiving device can perform, for example, various kinds of control such as output control (such as display or printing of data).

As described above, the communication device can use the PHY preamble in a radio frame to indicate whether NOMA is used to multiplex data included in the data field in the radio frame. According to this, a partner device that has received the radio frame can quickly recognize whether data in the radio frame is multiplexed using the NOMA scheme, so that it can execute appropriate data obtaining processing (receiving processing). In addition, in the example described above, since the parameters such as the primary modulation scheme or MCS index and the transmission power are included in the PHY preamble, the communication device can use various parameters in communication using the NOMA scheme. Further, since the field indicating whether SIC is necessary is included in the PHY preamble, the communication device can change, for each radio frame, the receiving device required to perform SIC. According to them, it becomes possible to perform appropriate communication adopted to various transmission path environments and their changes between the transmitting device and the receiving device. Note that in addition to the AP 102 and STAs 103 to 105 serving as communication devices, the present invention can be implemented by an information processing device (for example, a radio chip) that generates the PHY preamble described above.

Note that the PHY preamble of a predetermined radio frame such as a beacon or Probe Response transmitted by the AP 102 or a Probe Request transmitted by the STA may be configured to include a legacy field but not to include any EHT-SIG. In addition, the PHY preamble of the predetermined radio frame may be configured to include an EHT-SIG but not to include any NOMA subfield. In this manner, depending on the type of the radio frame, whether to arrange an EHT-SIG or whether to arrange a field related to the NOMA scheme in the EHT-SIG may be switched.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-075763, filed Apr. 11, 2019 which is hereby incorporated by reference herein in its entirety.

What is claimed is:

1. A communication device that is capable of performing wireless communication, comprising:
   one or more processors; and
   one or more memories including instructions that, when executed by the one or more processors, cause the communication apparatus to:
   transmit or receive a radio frame complying with IEEE_802.11 standard series, the radio frame including a preamble and a data field of a physical layer (PHY),
   wherein the preamble includes a Legacy Training Field, a Legacy Signal Field, a non-Legacy Training Field, and a non-Legacy Signal Field, and
   wherein the non-Legacy Signal Field includes a subfield in which information is set, the information indicating whether NOMA (Non-Orthogonal Multiple Access) is used in transmission of data included in the data field is set.

2. The device according to claim 1, wherein the non-Legacy Signal Field includes a field in which a parameter related to the NOMA is set if the NOMA is used in the transmission of the data.

3. The device according to claim 2, wherein the field in which the parameter is set, the parameter related to the NOMA is set for each receiving device that receives the radio frame.

4. The device according to claim 2, wherein the field in which the parameter is set includes a field that indicates a primary modulation scheme of the data multiplexed using the NOMA.

5. The device according to claim 2, wherein the field in which the parameter is set includes a field that indicates an MCS (Modulation and Coding Scheme) of the data multiplexed using the NOMA.

6. The device according to claim 2, wherein the field in which the parameter is set includes a field that indicates transmission power of the data multiplexed using the NOMA.

7. The device according to claim 2, wherein the field in which the parameter is set includes a field that indicates whether SIC (Successive Interference Cancellation) needs to be used to obtain the data multiplexed using the NOMA.

8. The device according to claim 7, wherein a receiving device that has received the radio frame obtains data addressed to the receiving device by canceling a signal component addressed to another receiving device, based on information related to data addressed to the other receiving device and multiplexed using the NOMA.

9. The device according to claim 1, wherein the radio frame is any one of a SU (Single User) PPDU (Physical Layer Protocol Data Unit), an ER (Extended Range) SU PPDU, and an MU (Multi User) PPDU.

10. An information processing device that is capable of performing wireless communication, comprising:
    one or more processors; and
    one or more memories including instructions that, when executed by the one or more processors, cause the communication apparatus to:
    generate a radio frame complying with IEEE_802.11 standard series, the radio frame including a preamble and a data field of a physical layer (PHY),
    wherein the preamble includes a Legacy Training Field, a Legacy Signal Field, a non-Legacy Training Field, and a non-Legacy Signal Field, and
    wherein the non-Legacy Signal Field includes a subfield in which information is set, the information indicating whether NOMA (Non-Orthogonal Multiple Access) is used in transmission of data included in the data field is set.

11. A communication method performed by a communication device that is capable of performing wireless communication, comprising:
    transmitting or receiving a radio frame complying with IEEE_802.11 standard series, the radio frame including a preamble and a data field of a physical layer (PHY),
    wherein the preamble includes a Legacy Training Field, a Legacy Signal Field, a non-Legacy Training Field, and a non-Legacy Signal Field, and
    wherein the non-Legacy Signal Field includes a subfield in which information is set, the information indicating whether NOMA (Non-Orthogonal Multiple Access) is used for transmission of data included in the data field is set.

12. A control method performed by an information processing device that is capable of performing wireless communication, comprising:
    generating a radio frame complying with IEEE_802.11 standard series, the radio frame including a preamble and a data field of a physical layer (PHY),
    wherein the preamble includes a Legacy Training Field, a Legacy Signal Field, a non-Legacy Training Field, and a non-Legacy Signal Field, and wherein the non-Legacy Signal Field includes a subfield in which information is set, the information indicating whether NOMA (Non-Orthogonal Multiple Access) is used for transmission of data included in the data field is set.

13. A non-transitory computer-readable storage storing a computer program for causing a computer to execute a control method of a communication apparatus that is capable of performing wireless communication, the method comprising:

transmitting or receiving a radio frame complying with IEEE_802.11 standard series, the radio frame including a preamble and a data field of a physical layer (PHY), wherein the preamble includes a Legacy Training Field, a Legacy Signal Field, a non-Legacy Training Field, and a non-Legacy Signal Field, and wherein the non-Legacy Signal Field includes a subfield in which information is set, the information indicating whether NOMA (Non-Orthogonal Multiple Access) is used for transmission of data included in the data field is set.

14. A non-transitory computer-readable storage medium storing a computer program for causing a computer to execute a control method of a communication apparatus that is capable of performing wireless communication, the method comprising:

generating a radio frame complying with IEEE_802.11 standard series, the radio frame including a preamble and a data field of a physical layer (PHY), wherein the preamble includes a Legacy Training Field, a Legacy Signal Field, a non-Legacy Training Field, and a non-Legacy Signal Field, and wherein the non-Legacy Signal Field includes a subfield in which information on whether NOMA (Non-Orthogonal Multiple Access) is used for transmission of data included in the data field is set.

* * * * *